May 16, 1967 E. D. HASENWINKLE ETAL 3,319,765
PRODUCTION LINE SPACING METHOD AND APPARATUS
Filed June 10, 1963 3 Sheets-Sheet 1

INVENTORS.
ERIC B. DENTON
EARL D. HASENWINKLE
BY HENRY M. PREUSSER

May 16, 1967 E. D. HASENWINKLE ETAL 3,319,765
PRODUCTION LINE SPACING METHOD AND APPARATUS
Filed June 10, 1963 3 Sheets-Sheet 3

INVENTORS.
ERIC B. DENTON
EARL D. HASENWINKLE
BY HENRY M. PREUSSER

United States Patent Office 3,319,765
Patented May 16, 1967

3,319,765
PRODUCTION LINE SPACING METHOD AND APPARATUS
Earl D. Hasenwinkle, Henry M. Preusser, and Eric B. Denton, Seattle, Wash., assignors to Weyerhaeuser Company, Tacoma, Wash., a corporation of Washington
Filed June 10, 1963, Ser. No. 286,555
8 Claims. (Cl. 198—34)

This invention relates to manufacturing laminated materials wherein laminae are held together, for example, by adhesives. More particularly the invention relates to controlled spacing of lamina on conveyors during continuous flow manufacture of such laminated materials.

The purpose of the method and apparatus of the invention is to provide spacing between laminae traveling on conveyors in a follow on relationship using means which are positive in operation yet versatile in adapting to reasonable variations in flow-timing of continuous operating equipment which handles laminae not necessarily of uniform size.

Such an overall method and apparatus in which this method and apparatus is utilized is described in application, Ser. No. 219,410 filed Aug. 27, 1962, now U.S. Patent No. 3,247,042.

Briefly described, this invention comprises the method and apparatus to move a spacer at an early production stage into a horizontal plane of manufacturing conveyors immediately before or after a passing conveyed lamina to establish both a minimum spacing and also a formidable vertical obstruction between this passing lamina and a preceding or following lamina.

Initial movement of the spacer, sometimes referred to as a spacer-abutment, in a preferred embodiment, is handled by rotative indexing equipment operating to positively advance spacer-abutments to a continuous closed loop sprocket driven chain serving first, as a positive feed means in the location of the spacer, thereafter as a frictional guide for the lamina moved spacer-abutment and finally as a chain drag drive to move the spacer-abutment back to the rotative indexing equipment triggered by a passing lamina edge sensing device.

This embodiment of the invention apparatus and method is illustrated in the accompanying drawings wherein.

Figure 4:
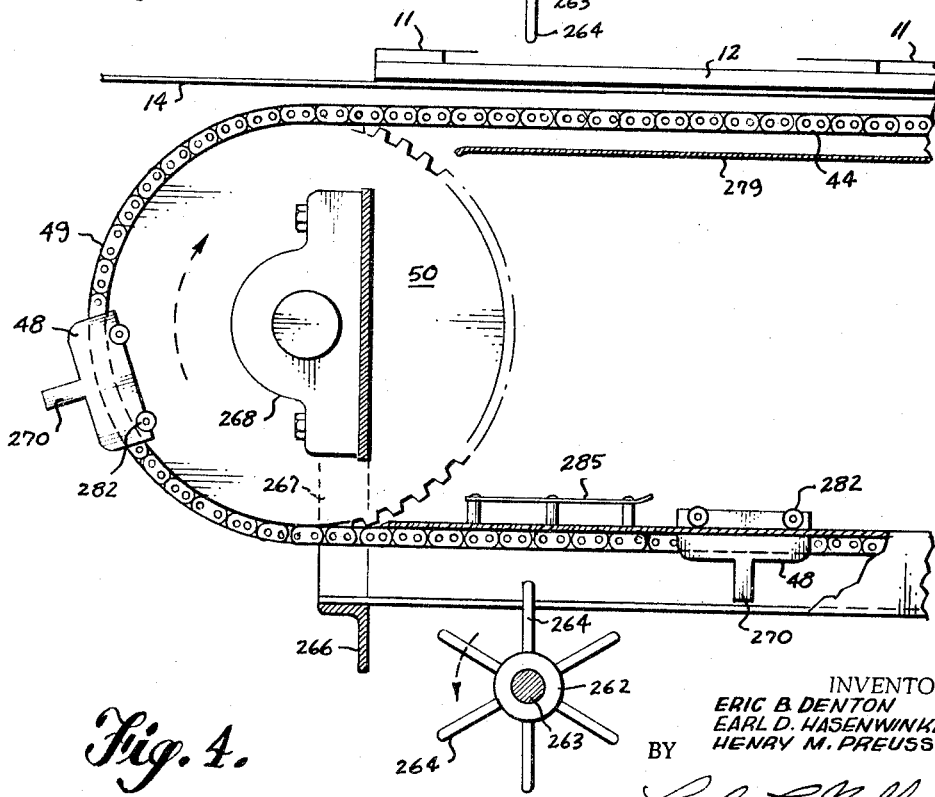
FIGURE 4 is a side elevation, with some parts in section, similar to FIGURE 3 showing a spacer abutment positively held between the chain and chain drive sprocket wheel.
Figures 5, 6:
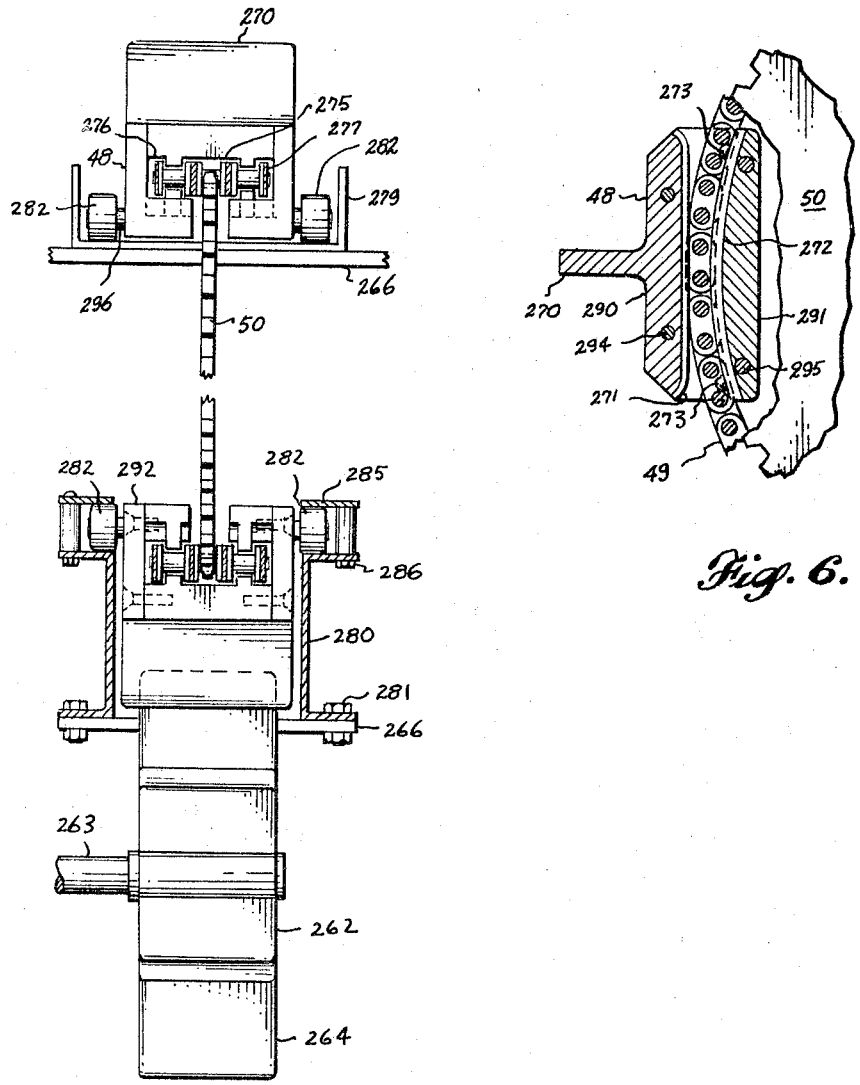

FIGURE 5 is a sectional view in a vertical plane taken near the chain drive sprocket wheel, rotative indexing equipment and spacer-abutments including supporting structure such as guide tracks for rolling gear of the spacer-abutments; and FIGURE 6 is a sectional view indicating in greater detail how the spacer-abutment is held between the chain and sprocket wheel during the positive translation movement illustrated in FIGURE 4.

In the overall manufacturing method and apparatus as presented in application, Ser. No. 219,410, after laminae, such as plywood centers 10, backs 11 and faces 12 are preliminarily sized as necessary, they are moved ahead and originally spaced one at a time along the conveyor means 14. This spacing is maintained throughout the production line thereby permitting subsequent operations to be initiated, monitored and accomplished. Therefore, the spacing must be maintained with certainty. Yet, until the adhesive operations are undertaken, the lamina requires special handling to insure respective end-to-end lamina will not undergo relative movement eliminating the interim spacing and/or overlap one another.

With regard to such special handling, precise regulation of laminae spacing, ultilizing a uniform timing system base on conveyor movement or some other approach initiated independently of the actual lamina flow, is not undertaken for several reasons. For example, although precise length sizing of the respective lamina is sought, it is not always obtained nor found to be practical at this operational stage. Likewise, uniformity in planar flatness of the respective laminae although desired is not practically obtainable. Nor are the follow on conveyor sections always able to transport a lamina at the same precise speed of either preceding or following laminae because of variations such as lamina weight and form causing frictional contact variations and also because of occasional slight speed variances in the respective follow-on conveyor sections.

Therefore, a method is utilized inserting spacers in between follow on laminae as they are initially placed on the continuing speed conveyor sections of the conveying means 14. The spacers 48 are positively placed before the leading edge or after the trailing edge of each lamina, such as a pack 11, and subsequently contacted and pushed on by the following lamina such as a back 11-face 12 combination co-traveling along the conveyor to subsequently establish a parting line or plane at the stacker 68 (not shown). Each spacer 48 is guided in a direction parallel to the conveyor means 14 and level thereto until its function is no longer required as the adhesive operations are undertaken. Thereafter, the spacer 48 is guided downward and then returned for subsequent utilization.

Figure 1:
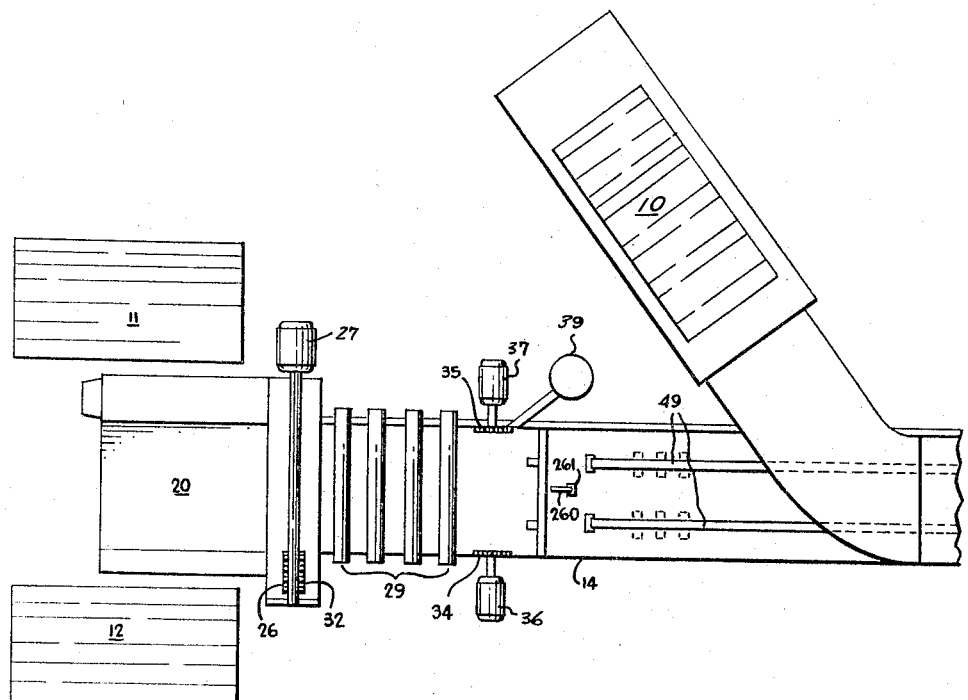
FIGURE 1 shows a fragmentary portion of apparatus shown in FIGURE 1 of application, Ser. No. 219,410, including added apparatus.
Figure 2:
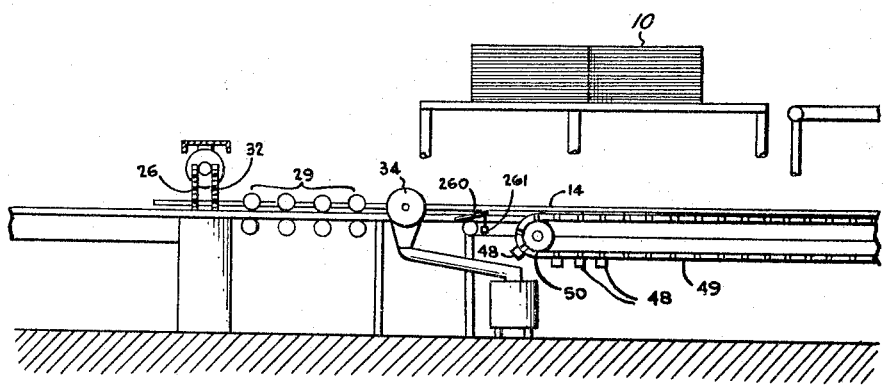
FIGURE 2 shows a fragmentary portion of apparatus shown in FIGURE 2 of application, Ser. No. 219,410, including added apparatus.
Figure 3:
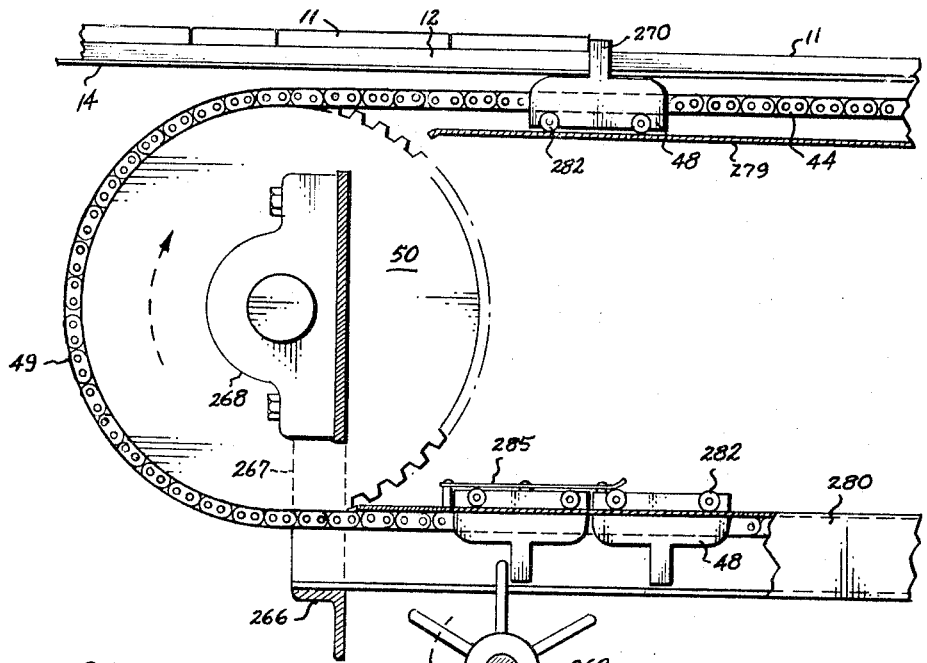
FIGURE 3 is a side elevation, with some parts in section, at the commencement of the sprocket-chain assembly, including rotative indexing equipment, spacer abutments and supporting structure.

An embodiment of apparatus utilized to perform this spacing method is illustrated in the drawings. Only the commencing stages of apparatus illustrated in application, Ser. No. 219,410 are shown and enlarged in FIGURES 1 and 2 of this application to more clearly illustrate the environment of specific apparatus used in this method of spacing lamina.

As needed, lamina 11 and 12, are preliminarily sized using trimming means 26, 32, 34 and 35 and advanced to the commencement of continuing speed sections of conveyor means 14 by intermittently operating powered feed rollers 29 located just beyond the initial lamina receiving table 20.

As movement occurs of pre-sized lamina onto the first continuing speed conveyor section, one of the lamina edges, optionally the leading edge, depresses a pivotal lever 260 of operating energy controlling sensing means 261.

Thereafter, as noted by viewing all the figures, energy is utilized through conventional means (not shown), such as an electrical motor to move an indexing paddle wheel 262 rotatably mounted (not shown) on shaft 263 in turn mounted on the conveyor means 14. Movement of the wheel 262, first clears a paddle 264 from restraining a spacer-abutment 48 for continuing frictional movement on a continuously moving chain belt 49. There are two such chain belts 49 on either side of the center line of the conveyor traveling around driven assemblies of pulley wheels 50 also supported on the conveyor means 14 using respective framing members 266, 267 and 268 (partially shown).

The cleared frictionally moving spacer 48 thereafter is positively pushed by a follow-on paddle 264 as the indexing wheel 262 completes a partial revolution, which is one-sixth of a revolution where six paddles 264 are optionally, radially and equally spaced around the wheel 262. The positive pushing motion accelerates the spacer 48 into captive contact between the chain belt 49, preferably a tripple roller chain, and a single sprocket wheel 50.

The captive spacer 48 is rotated positively with sprocket wheel 50 from the lower return chain elevation to the upper progressing conveyor height chain elevation and released for chain frictional movement until pushed on down conveying means 14 by an approaching lamina, which optionally is the lamina initiating controlling operations of sensing means 261. To avoid the lamina over-running the spacer 48, an upstanding abutment 270 is formed at its top.

Other structural aspects of spacer 48 in addition to this upstanding abutment 270 also serve to enhance its usefulness and to improve operation of the entire lamina spacing method and apparatus. There is the operational objective of the prompt availability of spacers in readiness being delivered to their spacing locale upon the operation of the sensing means 261. As indicated previously, this spaced delivery operation may or may not occur with overall timing regularity for many reasons, such as irregularity of lamina lengths, initial lamina feeding rates and conveyor speed settings. Therefore, many spacers are needed, necessitating a reserve supply. This is accomplished by having the spacers 48 idling around the moving chain 49 for a time before their respective acceleration by the paddle wheel 262 into the delivery grip of sprocket wheel 50 and moving chain 49 operational combination. Yet during the spacer return times, the frictional forces between the chain 49 and spacers 48 are sufficient to move the spacers along the chain 49. Even though these two apparent opposing motion requirements are undertaken, the frictional forces are not overly burdensome on the driving power requirements of the chain-sprocket wheel-spacer assembly.

To insure such operation and to retain directive control over spacer 48 functioning alternately as a lamina pushed spacer, a chain dragged spacer, an idling spacer and a positively delivered spacer, spacer 48 is designed with interior contours 271 including curved 272 and spherical surfaces 273 to restrictively pass chain 49 on a horizontal run and to interlock with chain 49 and sprocket wheel 50 when the spacer's direction of motion is changed. The orientation of the spacer about the chain is stabilized by fitting such interior contours to a triple roller chain configuration. The center chain section 275 engages with sprocket wheel 50, and the outer chain sections 276 and 277 together are the primary contacts with spacer 48.

Further stability and guidance control over the traveling spacers 48 is provided by upper 279 and lower 280 tracks or guides extending between pulley wheels 50 and secured to conveyor framing members, like member 266, by fasteners 281. Moving contact between spacers 48 and guides 279 and 280 is preferably made through roller wheels 282 rotatably mounted on the spacers 48.

To insure the entire acceleration force of paddle wheel 262 will move spacers 48 into captive engagement between chain 49 and sprocket wheel 50, a top boundary fence 285 is utilized on lower guide 280. Fasteners 286 hold top boundary fence 285 on lower guide 280 above paddle wheel 262.

The illustrated construction of spacer 48 shows its top 290, bottom 291 and side plates 292 assembly. As noted in FIGURE 6, holes 294 in top 290 accommodate fasteners (not shown) which hold together top 290 and side plates 292. Holes 295 rotatably receive spacer roller axles 296 arranged with spacer rollers 282 in an assembly which also maintains spacer assembly together in conjunction with fasteners (not shown) inserted through holes 294.

In whatever apparatus embodiment the method of the invention is practiced, many of the objectives remain the same. There must be sufficient spacers awaiting positive feeding into an operational spacer-abutment position. The timing of the positive spacer feeding should preferably be initiated by the conveyed laminae of possibly varied lengths, arriving sometimes irregularly. Sufficient vertical contact area on the spacers is required to prevent the following pushing lamina from overrunning the spacer and consequently the preceding lamina. Also the spacer must be guided and otherwise controlled at all times to serve its positive spacing function without interfering with the overall manufacturing flow of the conveyed laminae being combined with other materials to form various laminated products.

We claim:
1. In a method of manufacturing products on a potentially continuous flow production conveying means, a method of spacing products, comprising:
 (a) feeding said products toward said conveying means maintaining a space between adjacent products;
 (b) sensing the movement of each approaching product toward said conveyor means; and
 (c) positively placing, in response to the sensed movement of said approaching product, spacing means on said conveyor at its conveying level in advance of said approaching product to establish a minimum space between adjacent products as required for further processing.

2. In a method of manufacturing laminated products on a potentially continuous flow production conveyor line wherein spacing of some laminae is required so the passing lamina may initiate, control and accomplish production operations, a method of spacing laminae, comprising:
 (a) maintaining a spacer supply near the commencement of the continuous flow production line;
 (b) supporting and moving the spacer supply in a closed loop travel path co-extensive with the production line where needed;
 (c) feeding each lamina to said production line with a space between the trailing edge of a previously fed lamina and the leading edge of the oncoming lamina;
 (d) sensing the movement of said leading edge toward said production line;
 (e) directing in response to said sensed movement a spacer from said spacer supply along the loop to said conveyor level to be inserted ahead of said leading edge.

3. In a method of manufacturing laminated products, the method of spacing laminae, as defined in claim 2, comprising the method of controlling the spacers by semi-idling, limited frictional engagement of the spacers with their closed loop travel supports.

4. In a machine for manufacturing laminated products on a product line conveyor means continuously operable to receive laminae and triggered throughout its length by the conveyed laminae to perform fabricating operations, apparatus to establish and maintain necessary spacing between follow on lamina, comprising:
 (a) spacers having sufficient confronting surfaces to be contacted, driven, but not overridden by oncoming lamina, guided on directional motion controlling means, moved back for reuse, and positively refed into a lamina flow interference spacing position;
 (b) directional motion controlling means having a driven guide means frictionally passing through the spacers;
 (c) powered, positive, rotative holding-feeding means operated to hold spacers in readiness and to move spacers into spacing conveyor positions; and (d) sensing means triggered by approaching lamina to release energy consumed in operating the powered positive rotative holding-feeding means thereby placing a spacer between follow on lamina.

5. In the spacing apparatus as defined in claim 2, a directional motion controlling means for the spacers having a driven guide means comprising triple roller chains and at least two single sprocket wheels moving and supporting the triple roller chains by driving the center roller chain.

6. In the spacing apparatus as defined in claim 5, additional apparatus to directionally control the spacers comprising rollers on the spacers and guides supported on the conveyor means between the sprocket wheels of the directional motion controlling means upon which the spacer rollers travel.

7. In the spacing apparatus as defined in claim 2, powered, positive, rotative spacer holding-feeding means comprising a motor and a multiple radial paddle wheel both mounted on the conveyor means near the directional motion controlling means to hold spacers in idling check until needed and thereafter upon triggering feeding the next spacer into positive engagement with the directional motion controlling means.

8. In the spacing apparatus as defined in claim 2, sensing means triggered by approaching laminae to release energy consumed in operating the powered, positive, rotative, spacer holding-feeding means, comprising a pivotal lever mounted on the conveyor means, raised slightly above the conveyor means for contact and movement downward when laminae pass, and energy controlling sensing means mounted on the conveyor means and operated upon the downward movement of the lamina contacted pivotal lever thereby releasing energy to the powered, positive, rotative spacer holding-feeding means.

References Cited by the Examiner
UNITED STATES PATENTS

| | | | |
|---|---|---|---|
| 2,787,214 | 4/1957 | Halahan et al. | 271—45 |
| 2,907,443 | 10/1959 | Del Rosso | 198—34 |
| 3,106,279 | 10/1963 | Cross | 198—34 |

EARL M. BERGERT, *Primary Examiner.*

T. R. SAVOIE, *Assistant Examiner.*